(12) United States Patent
Lin et al.

(10) Patent No.: US 7,907,426 B2
(45) Date of Patent: Mar. 15, 2011

(54) FLYBACK CIRCUIT PROVIDING SYNCHRONIZED CONTROL

(75) Inventors: Kuo-Fan Lin, Taoyuan Hsien (TW); Chien-Li Tsai, Taoyuan Hsien (TW)

(73) Assignee: FSP Technology Inc., Taoyuan, Taoyuan Hsien (TW)

( * ) Notice: Subject to any disclaimer, the term of this patent is extended or adjusted under 35 U.S.C. 154(b) by 400 days.

(21) Appl. No.: 12/189,419

(22) Filed: Aug. 11, 2008

(65) Prior Publication Data

US 2010/0033995 A1 Feb. 11, 2010

(51) Int. Cl.
*H02M 3/335* (2006.01)
(52) U.S. Cl. .................................. 363/21.12; 363/21.14
(58) Field of Classification Search .... 363/21.12–21.18, 363/21.06
See application file for complete search history.

(56) References Cited

U.S. PATENT DOCUMENTS

| | | | |
|---|---|---|---|
| 5,872,705 A * | 2/1999 | Loftus et al. ............... | 363/21.14 |
| 6,424,544 B1 | 7/2002 | Svardsjo | |
| 7,233,505 B2 | 6/2007 | Chen | |
| 7,499,294 B2 * | 3/2009 | Lin et al. ................... | 363/21.06 |
| 7,633,777 B2 * | 12/2009 | Lin ............................ | 363/56.11 |
| 7,660,136 B2 * | 2/2010 | Yang .......................... | 363/21.06 |
| 7,800,923 B2 * | 9/2010 | Yang .......................... | 363/21.14 |
| 2008/0049456 A1 * | 2/2008 | Moromizato et al. ...... | 363/21.06 |

* cited by examiner

*Primary Examiner* — Jessica Han
(74) *Attorney, Agent, or Firm* — Winston Hsu; Scott Margo (57) ABSTRACT

A flyback circuit providing synchronized control includes a pulse width modulation (PWM) unit, a synchronized control unit and an ON period limiting unit. The PWM unit generates a driving signal to control a switch ON period of a primary winding and provides a synchronized signal prior to the generation of the driving signal that has output time series ahead the driving signal. The synchronized control unit receives the synchronized signal through an induction winding to set off a synchronized commutation switch. The ON period limiting unit starts a period limiting time series after the synchronized commutation switch has been set on. After the synchronized commutation switch is set off by the synchronized signal the ON period limiting unit is reset to an initial condition. The synchronized commutation switch maintains an ON condition until the period limiting time series end, then the ON period limiting unit generates a forced ending signal to set off the synchronized commutation switch so that the flyback circuit maintains operation at a minimum duty frequency.

7 Claims, 8 Drawing Sheets

FLYBACK CIRCUIT PROVIDING SYNCHRONIZED CONTROL

FIELD OF THE INVENTION

The present invention relates to a flyback circuit that provides synchronized control and particularly to a circuit to control synchronization of a primary side and a secondary side through a synchronized signal.

BACKGROUND OF THE INVENTION

Most electrical equipments nowadays require a power supply to receive and convert city power to DC or AC power to get a steady current for operation. The power supply may be formed in many types, such as converters, inverters and the like. One of them is flyback converter. In power supply circuits, adopting the flyback converter has many advantages, such as design is simpler and cost is lower. The circuit adopted in the flyback converter has a characteristic, namely the primary winding and the secondary winding of the transformer in the circuit to transform power have opposite polarities. When input current passes through the primary winding, the secondary winding usually does not have current passing through by employing a diode or a switch element, and energy is stored in the transformer. When the current stops passing through the primary winding, the diode is automatically set ON due to the secondary winding is induced by a potential in an opposite polarity, or the switch element is set ON to allow current to flow through the secondary winding. In order to improve efficiency, the flyback converters now on the market usually control the energy release of the secondary winding through a switch element. ON/OFF of the switch element is triggered by a control signal. Hence a special circuit is needed to control the switch element.

One of prior arts for setting off the secondary winding through a switch element is U.S. Pat. No. 7,233,505 entitled "High efficiency flyback converter with primary, secondary and tertiary windings". It includes a primary side coupling with a primary winding (12) and a secondary side coupling with a secondary winding (22), and a tertiary winding (23) to induce polarity alteration of the secondary winding (22). ON/OFF of the secondary side is controlled by a MOSFET (25). Operation of the MOSFET (25) is controlled by an induced signal of the tertiary winding. Namely, a synchronized operation takes place on the MOSFET caused by the self-excited secondary side. Another example is U.S. Pat. No. 6,424,544 entitled "Continuous mode flyback converter". It has a primary winding (101), a secondary winding (107) and an auxiliary winding (108). The auxiliary winding is induced polarity alteration of the primary winding to generate a signal to control operation of a transistor (110). It also sets synchronized start/stop of the secondary side through self-excited thereof. The flyback converters previously discussed that achieve synchronized control through the self-excited approach still have drawbacks. Basically, the self-excited signal is obtained through polarity alteration of the primary winding. The polarity alteration of the secondary winding results from current alteration of the primary winding. Namely, only after the polarity alteration of the primary winding has taken place, can reaction of the secondary start. Such an approach cannot achieve zero voltage switching (ZVS) effect, and a switch loss is generated. Moreover, in the event that the primary winding stops current switching due to a small load, short circuit or other abnormal conditions, the secondary winding cannot induce polarity alteration. Namely, the induced potential of the secondary winding does not change with the polarity alteration of the primary winding. Malfunction of the self-excited control mechanism occurs. And irregular and unpredictable self-excited frequency could take place due to many other factors such as load impedance, circuit impedance and the like. As a result, power waveforms generated on the secondary side become chaotic, and the flyback converter could be damaged.

SUMMARY OF THE INVENTION

In view of the aforesaid disadvantages occurred to the control techniques of the conventional self-excited flyback converters that are prone to become out of order in abnormal conditions and damage circuits, and do not synchronize the secondary side with the primary side, the present invention aims to provide a flyback circuit to synchronize the secondary side with the primary side through a synchronized signal and limit the minimum self-excited period to prevent malfunction of the circuit.

The flyback circuit according to the invention has a primary side coupling with a primary winding and a secondary side coupling with a secondary winding that are induced to form opposite polarities. The secondary winding has a current ON period controlled by start/stop of a synchronized commutation switch. The flyback circuit further has a pulse width modulation (PWM) unit, a synchronized control unit and an ON period limiting unit. The PWM unit generates a driving signal to control current ON period of the primary winding, and provides a synchronized signal prior to the generation of the driving signal that has output time series ahead the driving signal. The synchronized control unit receives the synchronized signal through an induction winding and sets off the synchronized commutation switch through the synchronized signal. After the synchronized commutation switch has been set ON the ON period limiting unit starts a period limiting time series. The synchronized commutation switch maintains the ON condition until the period limiting time series ends, then the ON period limiting unit generates a forced ending signal to set off the synchronized commutation switch. Meanwhile, the ON period limiting unit is reset to an initial condition. Such a control approach allows the flyback circuit to operate at a minimum duty frequency.

By means of the circuit structure set forth above the secondary side and the primary side can operate synchronously through the control signal to achieve zero voltage switch (ZVS) effect. In the event that the primary side suspends operation or enters an abnormal condition, the ON period limiting unit automatically maintains the minimum duty frequency to avoid self-excited malfunction of the flyback circuit.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
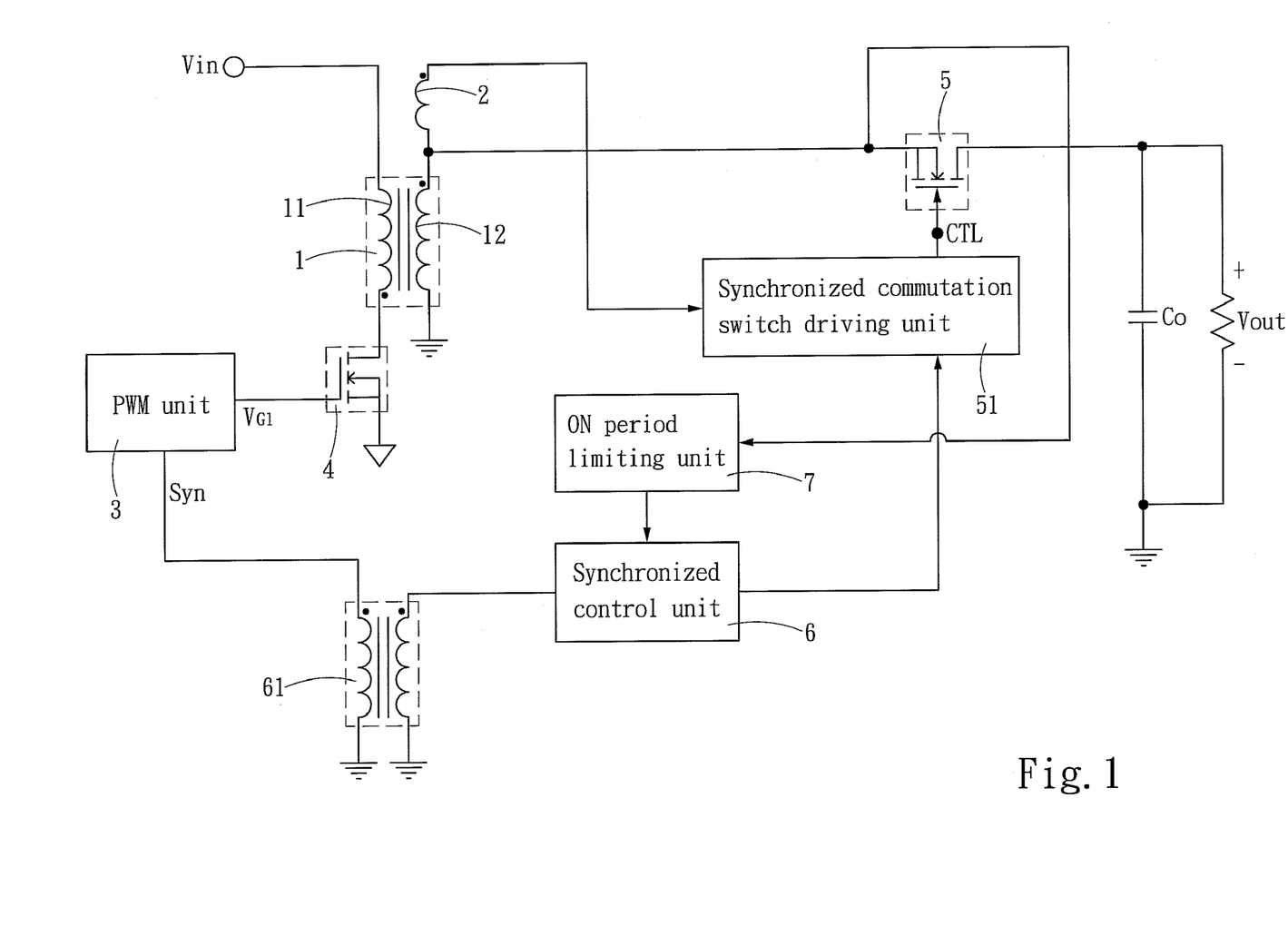
FIG. 1 is a circuit diagram of the invention.
Figure 2:
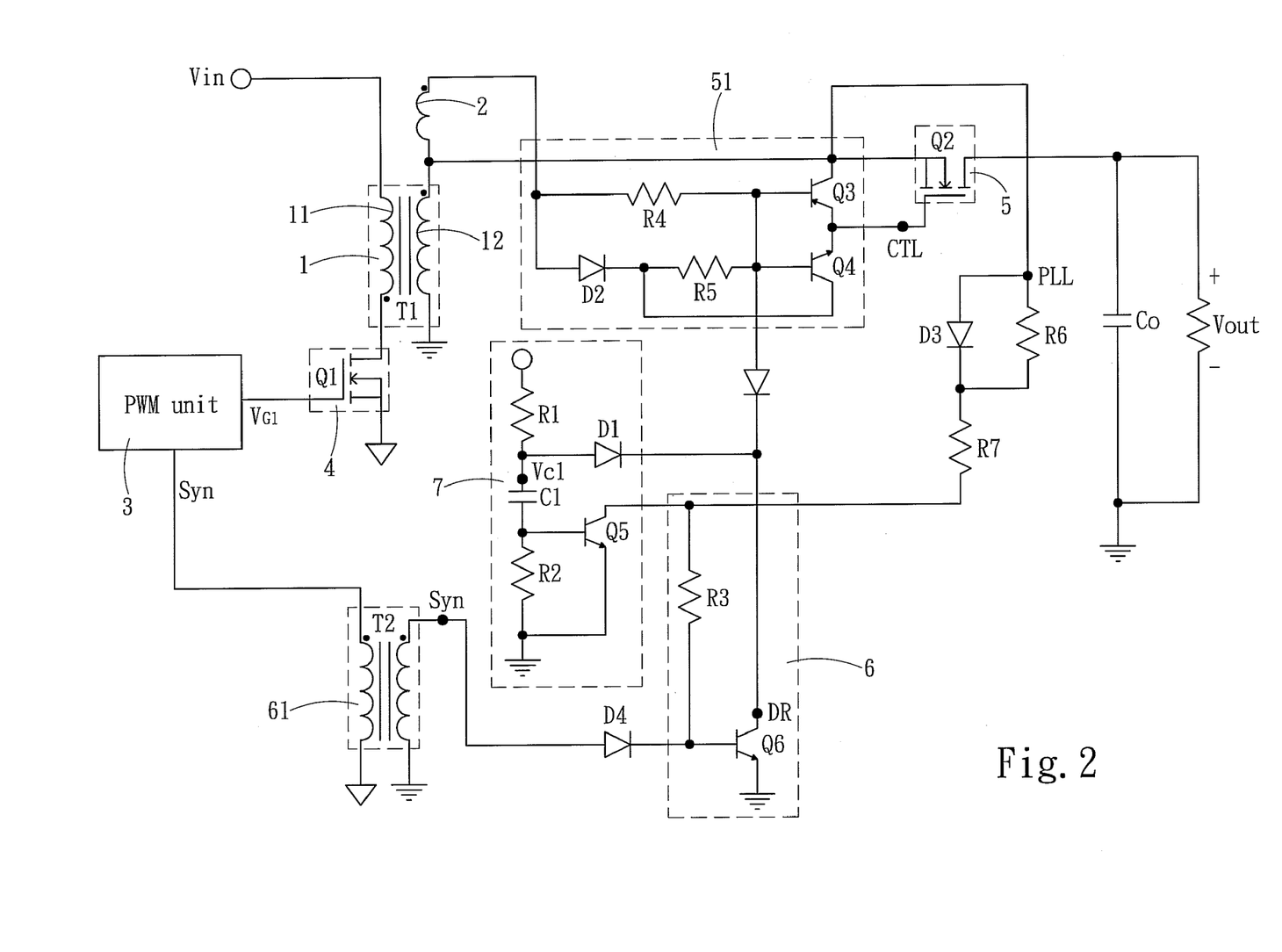
FIG. 2 is a circuit diagram of an embodiment of the invention.

Please referring to FIGS. 1 and 2, the flyback circuit providing synchronized control according to the invention includes a transformer 1 which has a primary side coupling with a primary winding 11 and a secondary side coupling with a secondary winding 12 that are induced to form opposite polarities. The secondary winding 12 has a current ON period controlled by start/stop of a synchronized commutation switch 5. The primary winding 11 has another current ON period controlled by a PWM unit 3. The PWM unit 3 generates a driving signal ($V_{G1}$) to drive start/stop of a power switch 4, and consequently control the another current ON period of the primary winding 11. The PWM unit 3 further provides a synchronized signal (Syn) before generating the driving signal ($V_{G1}$) that has output time series ahead the driving signal ($V_{G1}$). The synchronized signal (Syn) is sent to the secondary side through an induction winding 61. A synchronized control unit 6 is provided to receive the synchronized signal from the induction winding 61 to set off the synchronized commutation switch 5. There is also a self-excited winding 2 adjacent to the secondary winding 12. After the PWM unit 3 has set off the power switch 4, the self-excited winding 2 is induced by polarity alteration of the primary winding 11 and generates a self-excited signal to set on the synchronized commutation switch 5. When the synchronized commutation switch 5 is set on, an ON period limiting unit 7 gets a current or voltage signal from the synchronized commutation switch 5 to start a period limiting time series. When the PWM 3 generates the synchronized signal next time to set off the synchronized commutation switch 5 the ON period limiting unit 7 also is reset to an initial condition. In the event that an abnormal condition or transient condition occurs to stop the PWM unit 3 to deliver the driving signal, the synchronized commutation switch 5 continuously maintains the ON condition until the period limiting time series end. The ON period limiting unit 7 generates a forced ending signal to set off the synchronized commutation switch 5 to make the flyback circuit to operate at a minimum duty frequency. In the circuit previously discussed, the synchronized commutation switch 5 further is connected to a synchronized commutation switch driving unit 51 which is triggered by the self-excited signal of the self-excited winding 2 to provide an adequate voltage to maintain the synchronized commutation switch 5 in the ON condition. Hence the synchronized commutation switch driving unit 51 determines the ON time series of the synchronized commutation switch 5 according to the synchronized signal, forced ending signal and self-excited signal. By means of the circuit structure previously discussed, the flyback circuit, in addition to maintaining the basic self-excited function through the self-excited winding 2, further gets the synchronized signal (Syn) before the primary winding is magnetized through the synchronized control unit 6 and the induction winding 61 to set off the synchronized commutation switch 5. Moreover, to prevent out of order of the self-excited period on the secondary side due to suspended operation of the primary side, the ON period limiting unit 7 provides a period limiting time series. After the synchronized commutation switch 5 is ON and the period limiting time series has elapsed, the ON period limiting unit 7 sets off the synchronized commutation switch 5 to maintain the minimum duty frequency to avoid out of order of the self-excited period.

Figure 3A:
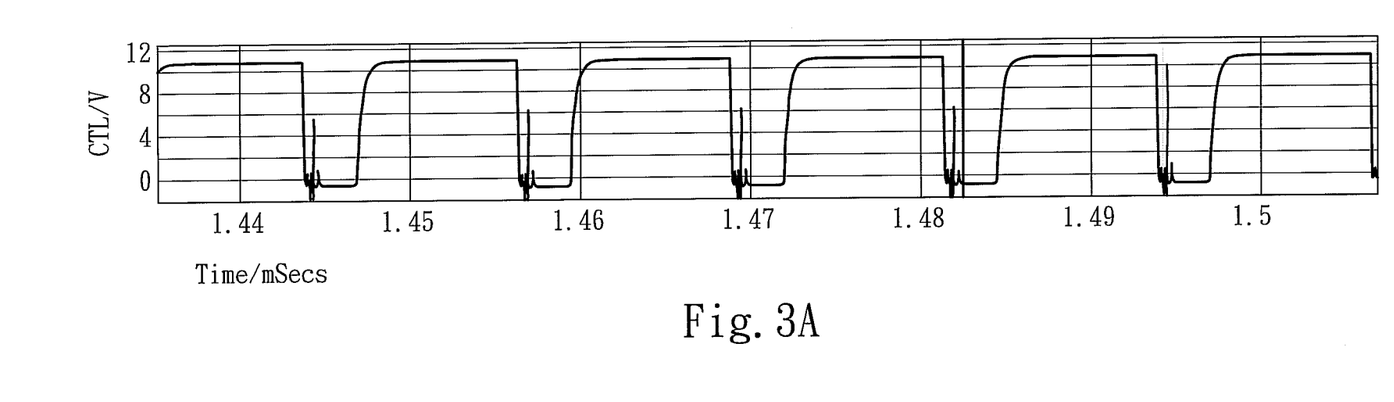
FIG. 3A is waveform chart-1 of the embodiment circuit.
Figure 3B:
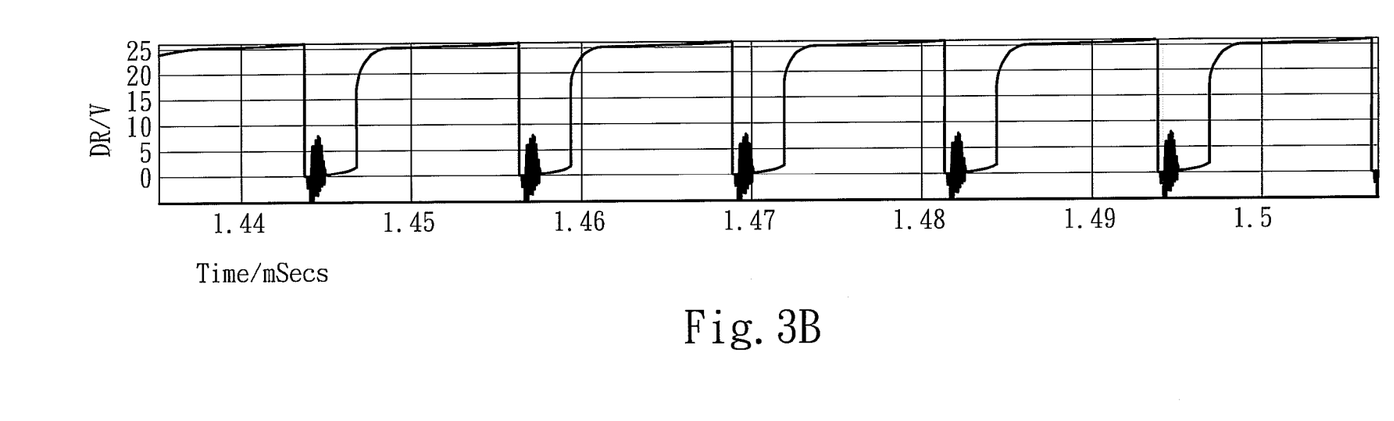
FIG. 3B is waveform chart-2 of the embodiment circuit.
Figure 3C:
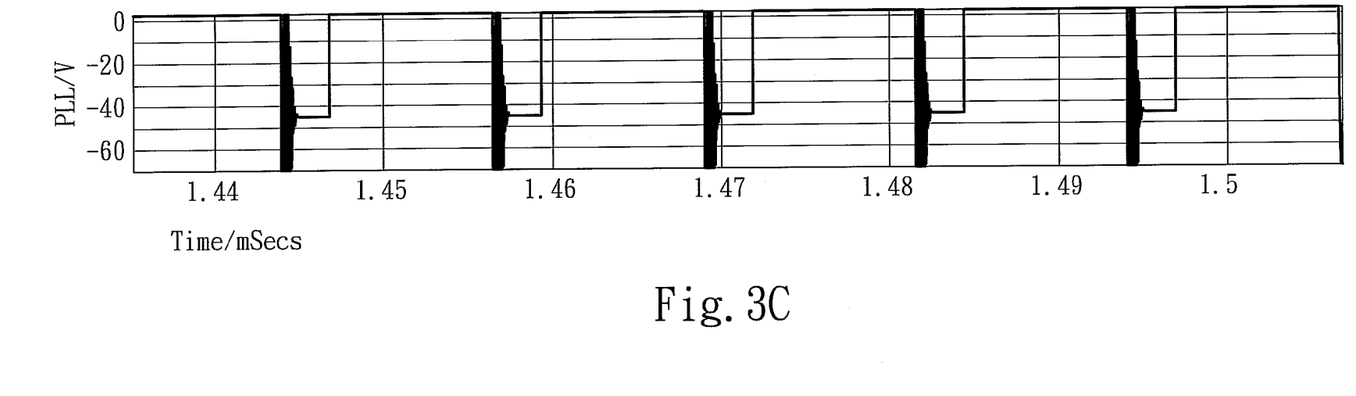
FIG. 3C is waveform chart-3 of the embodiment circuit.
Figure 3D:
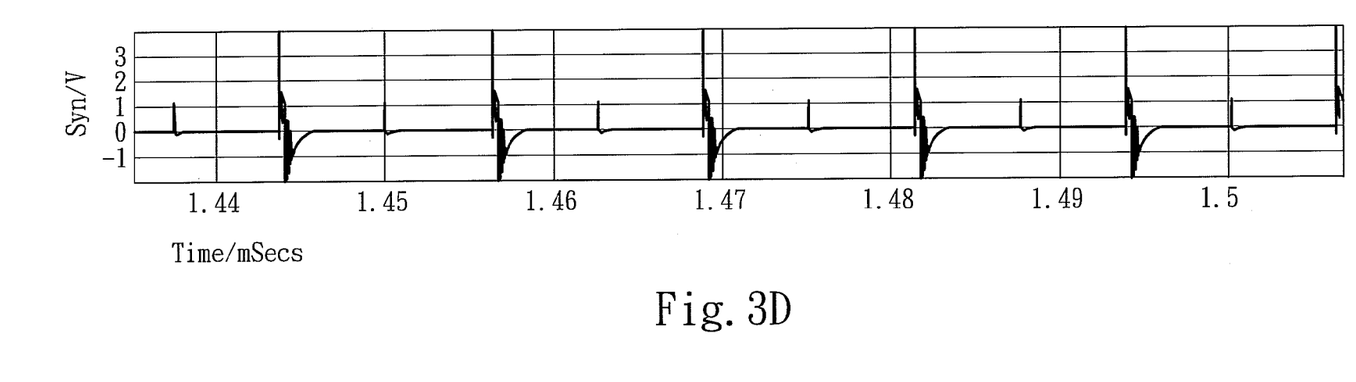
FIG. 3D is waveform chart-4 of the embodiment circuit.
Figure 3E:
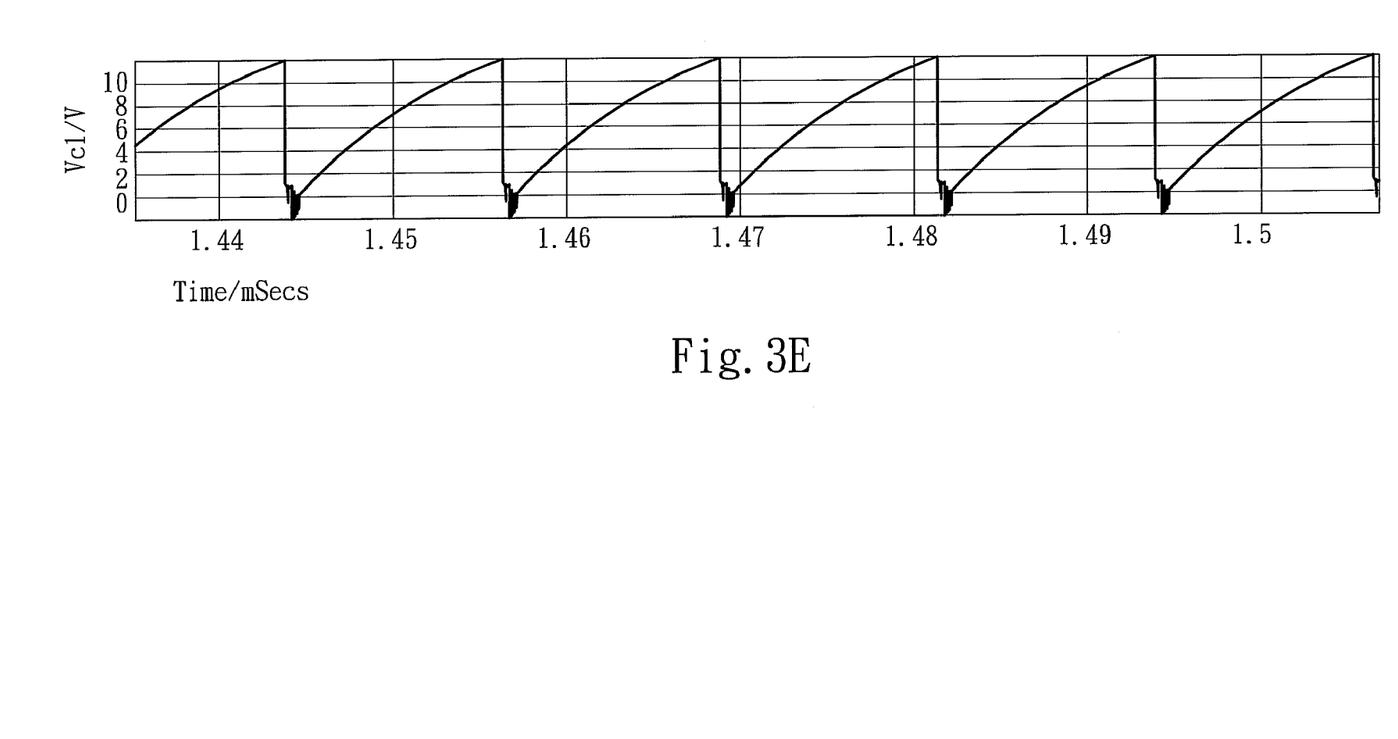
FIG. 3E is waveform chart-5 of the embodiment circuit.

Refer to FIGS. 2 and 3A through 3E for a circuit embodiment and waveform charts of various nodes in FIG. 2. The synchronized commutation switch driving unit 51 includes a bar-gate circuit (mainly consisting of semiconductor switches Q3 and Q4) with a high level and a low level to maintain the synchronized commutation switch 5 in a duty condition. The bar-gate circuit is triggered by the self-excited signal of the self-excited winding 2 to provide a steady voltage to maintain the synchronized commutation switch 5 in an ON condition. However, before the PWM 3 generates the driving signal ($V_{G1}$) to set on the power switch 4, it first generates the synchronized signal (Syn) to trigger a semiconductor switch Q6 in the synchronized control unit 6 through the induction winding 61, consequently the gate voltage of the bar-gate circuit in the synchronized commutation switch driving unit 51 is altered. As a result, the bar-gate circuit outputs at a low potential to set off the synchronized commutation switch 5. When the synchronized commutation switch 5 is ON, the ON period limiting unit 7 gets a current or voltage signal from the synchronized commutation switch 5. The ON period limiting unit 7 includes a charge/discharge circuit and a reference voltage source Vcc. The charge/discharge circuit is connected to the reference voltage source Vcc and sets a stop voltage level which can be determined by a conversion voltage of the semiconductor switch Q5. When the synchronized commutation switch 5 is ON, the charge/discharge circuit is charged through the reference voltage source Vcc. Generation of time series of the forced ending signal is depended upon whether the charged voltage of the charge/discharge circuit has reached the stop voltage level. Namely, when the synchronized commutation switch 5 is maintained in the ON condition, and the voltage of the charge/discharge circuit has reached the stop voltage level, the duty condition of the semiconductor switch Q5 changes, and the gate voltage of the bar-gate circuit also alters. Therefore the synchronized commutation switch 5 is set off to make the flyback circuit at the minimum duty frequency. In the event that the synchronized commutation switch 5 is triggered by the synchronized signal and set OFF, the charge/discharge circuit also is triggered to discharge. Hence the ON period limiting unit 7 is repeatedly reset to the initial condition to restart the period limiting time series. The period limiting time series are determined by charging charge/discharge circuit to the stop voltage level. FIG. 3A shows gate voltage waveforms (CTL) of the synchronized commutation switch 5. FIG. 3B shows voltage waveforms (DR) of $V_{CE}$ of the semiconductor Q6 of the synchronized control unit 6. FIG. 3C shows voltage waveforms (PLL) at two ends of the secondary winding of the transformer 12. FIG. 3D shows waveforms of the synchronized signal (Syn). FIG. 3E shows voltage waveforms ($V_{C1}$) at two ends of the capacitor of the charge/discharge circuit of the ON period limiting unit 7. These figures indicate that when the synchronized signal is at a high level, the synchronized commutation switch driving unit 51, capacitor voltage of the ON period limiting unit 7 and gate voltage of the synchronized commutation switch 5; are at a low level to set off the synchronized commutation switch 5. Hence the waveforms in FIGS. 3A, 3B and 3C are lowered to the low level until the current ON condition of the primary side alters. The secondary side generates current and voltage due to self-excited, and the charge/discharge circuit is triggered by the synchronized signal (Syn) and discharges. Hence in FIG. 3E the voltage waveforms at two ends of the capacitor also are lowered to a low level.

Figure 4A:
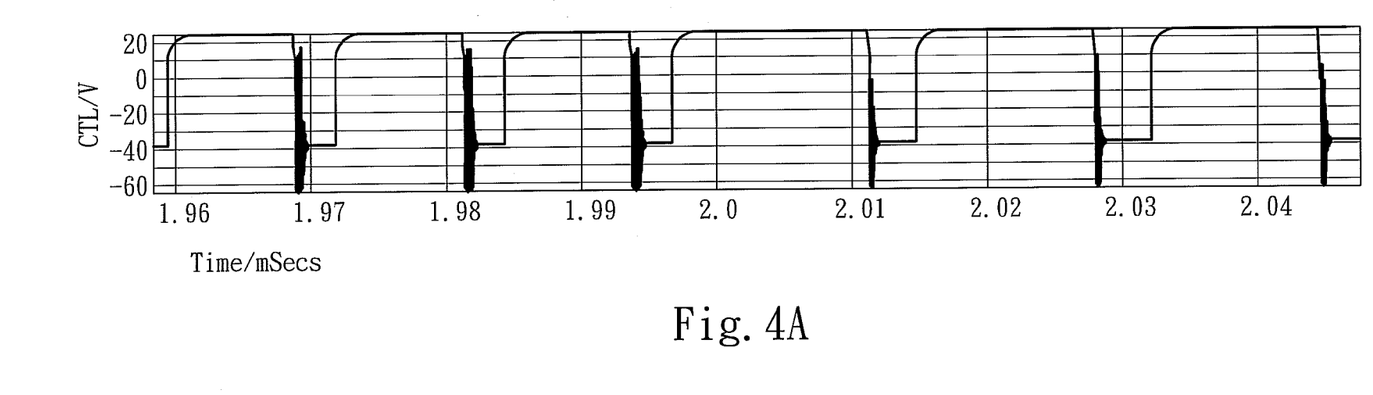
FIG. 4A is waveform chart-1 of the embodiment circuit in an abnormal condition.
Figure 4B:
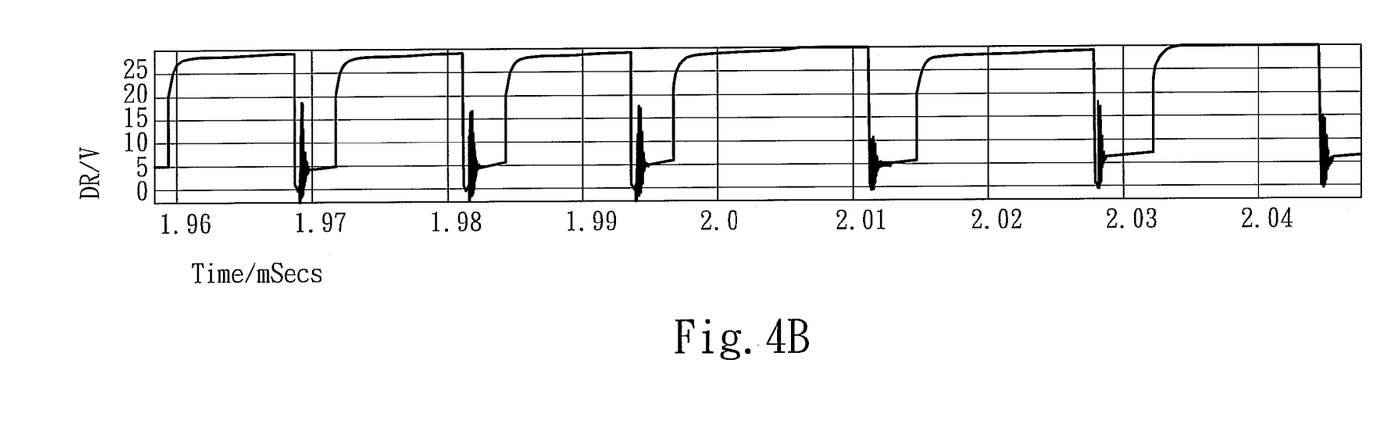
FIG. 4B is waveform chart-2 of the embodiment circuit in an abnormal condition.
Figure 4C:
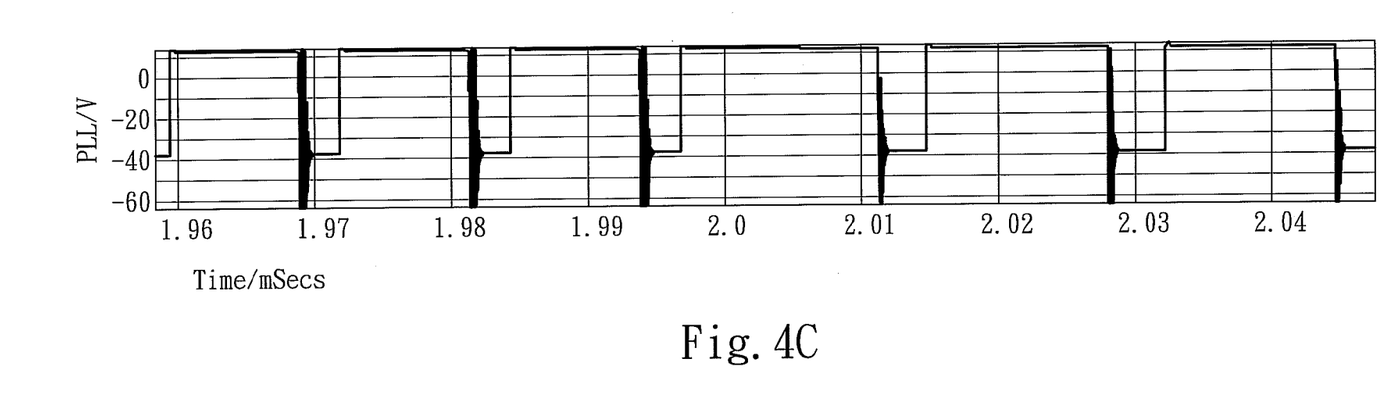
FIG. 4C is waveform chart-3 of the embodiment circuit in an abnormal condition.
Figure 4D:
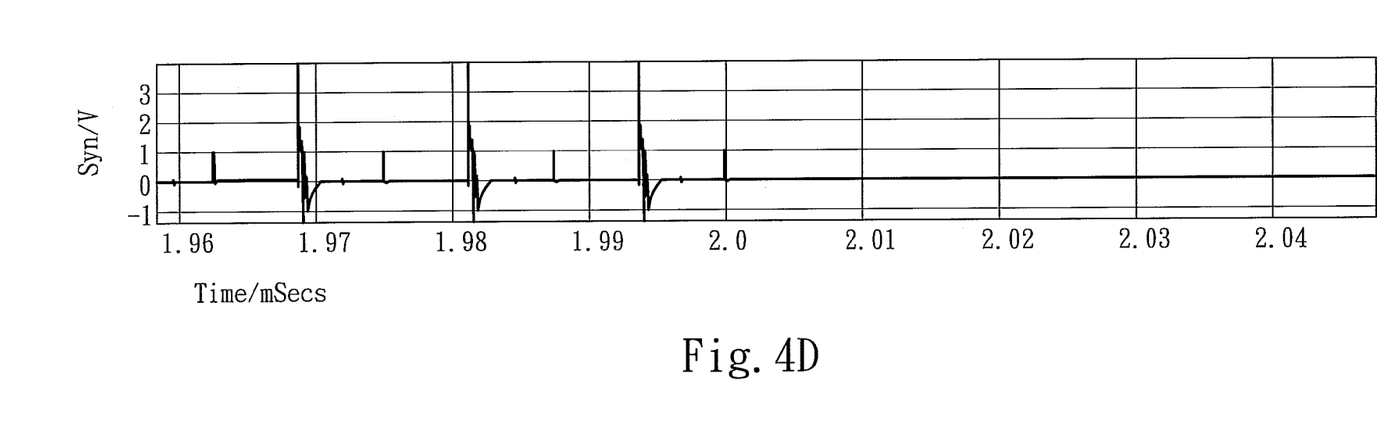
FIG. 4D is waveform chart-4 of the embodiment circuit in an abnormal condition.
Figure 4E:
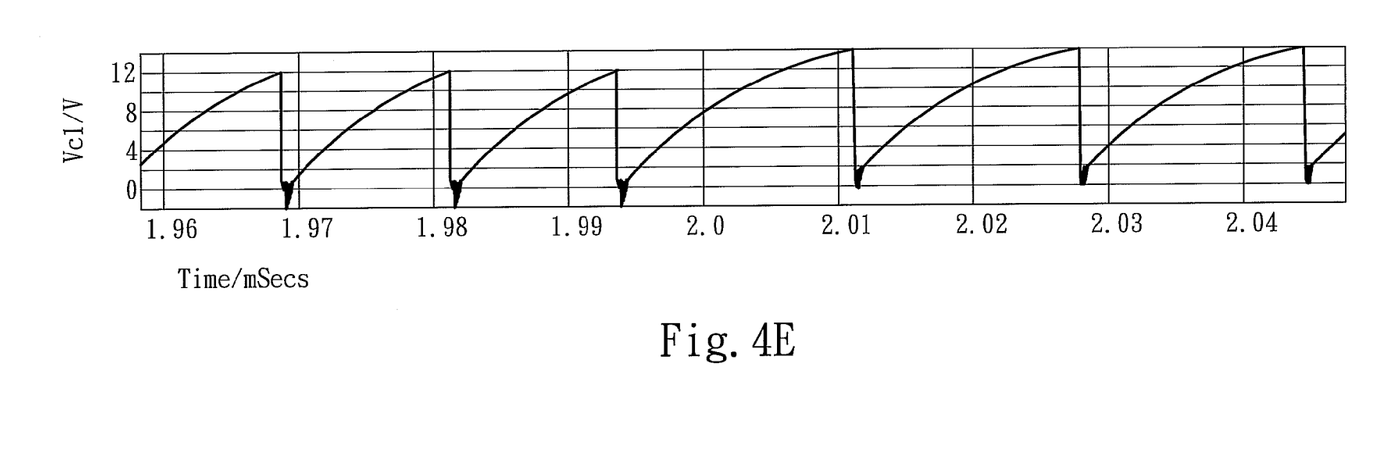
FIG. 4E is waveform chart-5 of the embodiment circuit in an abnormal condition.

Refer to FIGS. 4A through 4E for waveforms at various nodes of the flyback circuit shown in FIG. 2 during abnormal conditions. FIG. 4A shows gate voltage waveforms of the synchronized commutation switch 5. FIG. 4B shows voltage waveforms of $V_{CE}$ of the semiconductor Q6 of the synchronized control unit 6. FIG. 4C shows voltage waveforms at two ends of the secondary winding of the transformer 12. FIG. 4D shows waveforms of the synchronized signal (Syn). FIG. 4E shows voltage waveforms ($V_{C1}$) at two ends of the capacitor of the charge/discharge circuit of the ON period limiting unit 7. It is to be noted that, first, sending of the synchronized signal (Syn) stops after normal output of three pulse waves. It means that the PWM 3 also stops sending the driving signal $V_{G1}$ to stop operation of the primary side. If there is no triggering of the synchronized signal (Syn), the synchronized commutation switch 5 continuously maintains the ON condition. At this moment, the voltage of charge/discharge circuit in FIG. 4E should be noted particularly. In FIG. 4E, when the voltage of the charge/discharge circuit reaches the stop voltage level thereof (about 14V according to the waveforms), the charge/discharge circuit generates the forced ending signal to set off the synchronized commutation switch 5. Hence as shown in the waveforms in FIGS. 4A, 4B and 4C, the voltage waveforms can maintain a lower frequency and switch normally. Thus the flyback circuit can function as desired without losing control.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A flyback circuit providing synchronized control including a primary side which has a primary winding and a secondary side which has a secondary winding that are induced to form opposite polarities, the secondary winding having a current ON period controlled by start/stop of a synchronized commutation switch, the flyback circuit further comprising:

a pulse width modulation (PWM) unit to generate a driving signal to control ON period of a power switch of the primary winding and output a synchronized signal prior to generation of the driving signal that has time series ahead the driving signal;

a synchronized control unit to receive the synchronized signal through an induction winding to set off the synchronized commutation switch; and an ON period limiting unit to start a period limiting time series after the synchronized commutation switch has been set ON;

wherein the ON period limiting unit is reset to an initial condition after the synchronized commutation switch has been set off by the synchronized signal, the synchronized commutation switch being maintained in an ON condition until the period limiting time series end; the ON period limiting unit generating a forced ending signal to end the ON condition of the synchronized commutation switch so that the flyback circuit operates at a minimum duty frequency.

2. The flyback circuit of claim 1, wherein the synchronized commutation switch is connected to a synchronized commutation switch driving unit to determine ON time series of the synchronized commutation switch according to the synchronized signal, the forced ending signal and a self-excited signal.

3. The flyback circuit of claim 1, wherein the secondary side further includes a self-excited winding coupling with the primary winding to generate a self-excited signal through polarity alteration of the primary winding to drive the synchronized commutation switch.

4. The flyback circuit of claim 3, wherein the synchronized commutation switch is further connected to a synchronized commutation switch driving unit to determine ON time series of the synchronized commutation switch according to the synchronized signal, the forced ending signal and the self-excited signal.

5. The flyback circuit of claim 4, wherein the synchronized commutation switch driving unit includes a bar-gate circuit which has a high level condition and a low level condition to control duty conditions of the synchronized commutation switch.

6. The flyback circuit of claim 1, wherein the ON period limiting unit includes a charge/discharge circuit and a reference voltage source that are connected to each other, the charge/discharge circuit having a stop voltage level, generating of time series of the forced ending signal being determined by whether a charging voltage of the charge/discharge circuit has reached the stop voltage level.

7. The flyback circuit of claim 6, wherein the period limiting time series is determined by charging the charge/discharge circuit to reach the stop voltage level.

* * * * *